United States Patent
Krtolica (10) Patent No.: US 6,532,302 B2
(45) Date of Patent: *Mar. 11, 2003

(54) MULTIPLE SIZE REDUCTIONS FOR IMAGE SEGMENTATION

(75) Inventor: Radovan V. Krtolica, Los Gatos, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 172 days.

(21) Appl. No.: 09/057,346

(22) Filed: Apr. 8, 1998

(65) Prior Publication Data

US 2003/0012438 A1 Jan. 16, 2003

(51) Int. Cl.⁷ .................................................. G06K 9/34
(52) U.S. Cl. ..................................... 382/173; 382/298
(58) Field of Search ................................ 382/173, 177, 382/291, 292, 298, 299, 301, 286, 256, 257

(56) References Cited

U.S. PATENT DOCUMENTS

| | | | | |
|---|---|---|---|---|
| 5,202,933 A | | 4/1993 | Bloomberg | 382/9 |
| 5,434,953 A | | 7/1995 | Bloomberg | 395/139 |
| 5,680,479 A | | 10/1997 | Wang et al. | 382/176 |
| 5,778,092 A | * | 7/1998 | MacLeod et al. | 382/176 |
| 5,809,167 A | | 9/1998 | Al-Hussein | 382/190 |
| 5,848,185 A | * | 12/1998 | Koga et al. | 382/173 |
| 5,903,904 A | * | 5/1999 | Peairs | 707/526 |

FOREIGN PATENT DOCUMENTS

EP  0 657 838 A2  6/1995  ............ G06K/9/20

OTHER PUBLICATIONS

Deforges, O., et al., "A Fast Mutiresolution Text–Line and Non Text–Line Structures Extraction and Discrimination Scheme for Document Image Analysis", *Proceedings of the International Conference on Image Processing (ICIP)*, Nov. 13, 1994, Los Alamitos, California , U.S.A.

Fletcher, L. A., et al., "A Robust Algorithm For Text String Separation From Mixed Text/Graphics Images", *IEEE Transactions on Pattern Analysis and Machine Intelligence*, vol. 10, No. 6, Nov. 1988, New York, New York, U.S.A.

* cited by examiner

*Primary Examiner*—Phuoc Tran
(74) *Attorney, Agent, or Firm*—Fitzpatrick, Cella, Harper & Scinto (57) ABSTRACT

A sample image (144) is segmented by an image segmentation system (120) including a size reduction unit (134), which reduces the size of the image (144), and, at the same time, fills small gaps between foreground pixels. Thereafter, a connected component analyzer (136) identifies connected components and their associated minimum bounding rectangles in the reduced image (145). Next, a target object filter (138) searches the connected components for target objects, making use of a target object library (146) to identify target objects characterized by such parameters as size, shape, and texture. Finally, an inverse mapper (140) locates the bounding rectangles of the target objects in the original sample image (144), and extracts the associated portions of the image (144) for analysis in a conventional image classifier (142).

28 Claims, 8 Drawing Sheets

MULTIPLE SIZE REDUCTIONS FOR IMAGE SEGMENTATION

TECHNICAL FIELD

The present invention relates generally to image segmentation, and more particularly, to a method and system for image segmentation through multiple reductions of the size of an image.

BACKGROUND ART

In general, segmentation is the first step in the process of image recognition. Segmentation may be defined as the identification and separation of clusters of mutually close objects, that is, objects that are closer to each other than to any external object. The goal of segmentation is to extract target objects from the separated clusters that are characterized by such parameters as size, shape, granularity, texture, intensity of color, and location.

An aerial photograph, for example, may be segmented by identifying various target objects, i.e. landmarks, with different shapes and textures, such as fields, roads, buildings, bodies of water, and the like. Thereafter, the segmented objects may be extracted and compared with a database of such objects in order to identify the geographical location of the scene in the photograph.

Similarly, the process of segmentation is generally the first step in optical character recognition (OCR), in which a document is electronically scanned and converted into a form that can be easily manipulated by, for example, a word processor. Many documents, however, are complex, including two or more columns of text, as well as photographs, diagrams, charts, and other objects. Therefore, such documents are initially segmented in order to extract blocks of text for analysis.

In the OCR context, segmentation is often referred to as "line extraction" because it typically involves segmenting the document into a plurality of lines. Generally, lines are the basic unit of extraction because they indicate the flow of the text. In a multi-column document, for example, it is obvious why a knowledge of the line layout is essential to correctly interpreting the meaning of the text. Moreover, in recognizing a word or character, a knowledge the surrounding words and characters in a line permits the use of contextual and geometric analysis in resolving ambiguities.

Conventionally, segmentation is performed using a "bottom up" or "connected component" approach. This method involves decomposing the image into basic entities (connected components) and aggregating those entities according to some rule. For example, in a page of text, a single character is generally the most basic connected component. During segmentation, a character is identified and assigned a minimum bounding rectangle (MBR), which is defined as the smallest rectangle that completely contains a discrete pattern of a connected component. Thereafter, all of the MBRs within a certain distance from each other are aggregated. If the correct distance is chosen, the aggregated MBRs will form horizontal connected components representing lines of text, which may then be extracted for analysis.

Segmentation is performed automatically and almost instantly by the human brain. For example, when a person looks at a document, he or she can easily identify the text portions among a variety of other objects. However, as currently implemented, conventional methods and systems for image segmentation are slow and inefficient. This is particularly true with respect to segmenting complex documents including, for example, more than one column of text, halftone regions, graphics, and handwritten annotations.

Conventional approaches are time consuming because they must decompose the sample image, identify each of the individual connected components, calculate the distances between the components, and aggregate those components within a certain distance from each other. For complex documents, this process can result in a large number of calculations, and accounts for a significant portion of the overall processing time in image recognition. What is needed, then, is a segmentation method and system that is significantly faster than conventional approaches.

DISCLOSURE OF INVENTION

Figure 1:
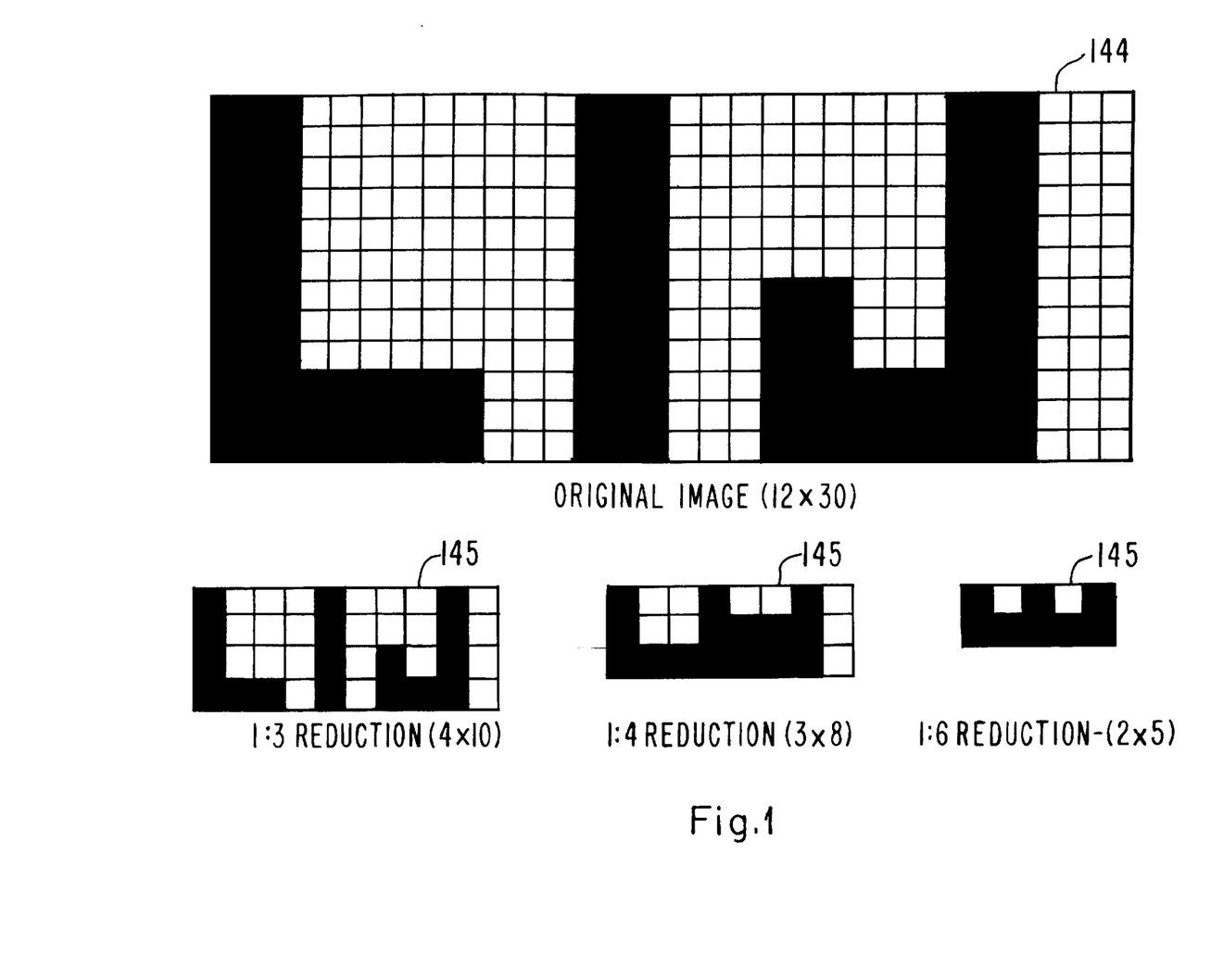
FIG. 1 is an illustration of a sample image 144, and a plurality of reduced images 145.

The present invention offers a more efficient, holistic approach to image segmentation. Briefly, the present invention recognizes the fact that components of a document, when viewed from a distance, tend to solidify and aggregate. For instance, if a person stands at a distance from a printed page, the lines of text appear to blur and, for practical purposes, become solid lines. This effect can be simulated on a computer by reducing the size or resolution of a scanned image. For example, as shown in FIG. 1, several characters on a line become a single connected component at a reduction of 1:4.

By exploiting this effect, a more efficient and substantially faster method for image segmentation is realized. According to the present invention, a size reduction unit (134) reduces the size of a sample image (144), and, at the same time, fills small gaps between foreground pixels. As noted above, size reduction tends to solidify clusters of connected components separated by narrow gaps. Thereafter, a connected component analyzer (136) identifies connected components and their associated minimum bounding rectangles in the reduced image (145). Next, a target object filter (138) searches the connected components for target objects, making use of a target object library (146) to identify target objects characterized by such parameters as size, shape, and texture. Finally, an inverse mapper (140) locates the bounding rectangles of the target objects in the original sample image (144), and extracts the associated portions of the image (144) for analysis in a conventional image classifier (142).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

System Architecture

Figure 2:
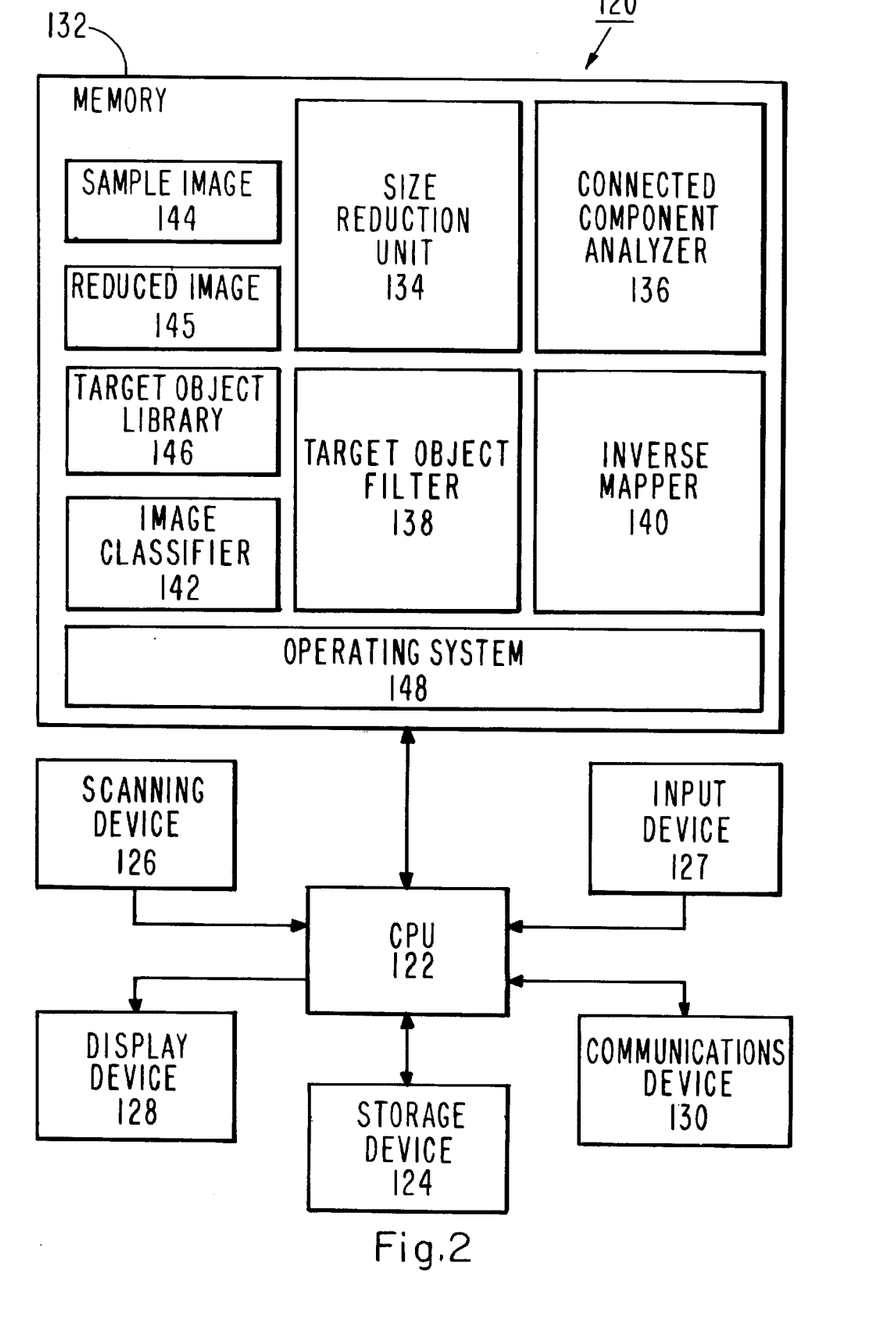
FIG. 2 is a physical block diagram of a system 120 for segmenting a sample image 144 in accordance with the present invention.

Referring now to FIG. 2, there is shown a physical block diagram of a system 120 for image segmentation in accordance with the present invention. In one embodiment, the present invention is implemented as software running on a conventional personal computer such as an IBM® PC or compatible. Thus, the hardware architecture of system 120 as shown in FIG. 2 is preferably implemented as a combination of components of such computer, although other implementations are possible.

A central processing unit (CPU) 122 executes software instructions and interacts with other components to perform the methods of the present invention. A storage device 124 provides long term storage of data and software programs, and may be implemented as a hard disk drive or other suitable mass storage device. A scanning device 126 obtains a two-dimensional array of pixel values representing the character to be recognized. In a preferred embodiment, scanning device 126 is an "HP ScanJet IIc" model digital scanner from Hewlett Packard Co., which provides a resolution of 400 dots (pixels) per inch, each pixel being quantized with an eight-bit grayscale resolution. Input device 127, such as a mouse or keyboard, facilitates user control of the operation of system 120. A display device 128 is an output device such as a cathode-ray tube or printer for the display of text and graphics under the control of CPU 122. System 120 may also include communication device 130 such as, for example, a modem or Ethernet card for connection to a computer network such as the Internet.

System 120 also includes a memory 132 for storing software instructions to be executed by CPU 122. Memory 132 is implemented using a standard memory device, such as a random access memory (RAM). In a preferred embodiment, memory 132 stores a number of software objects or modules, including a size reduction unit 134, a connected component analyzer 136, a target object filter 138, an inverse mapper 140, and an image classifier 142. Throughout this discussion, the foregoing modules are assumed to be separate functional units, but those skilled in the art will recognize that the functionality of various units may be combined and even integrated into a single software application or device.

In a preferred embodiment, the memory 132 is also used to store a sample image 144, a reduced image 145, and a target object library 146. The sample image 144 is preferably a bi-level, bitmapped image captured by the scanning device 126. The reduced image 145 is a reduced version of the sample image 144. The target object library 146 is a repository of target object definitions, and is used in one embodiment of the invention by the target object filter 138 to identify target objects from a set of connected components.

Finally, memory 132 includes an operating system 148, for managing, and providing system resources to, the above-mentioned software objects or modules. Preferably, operating system 148 is the Windows 95 operating system manufactured by Microsoft Corporation of Redmond, Washington, although a variety of other operating systems, such as Windows NT and UNIX, may be used within the scope of the present invention.

Dataflow of the Image Segmentation System

Figure 3:
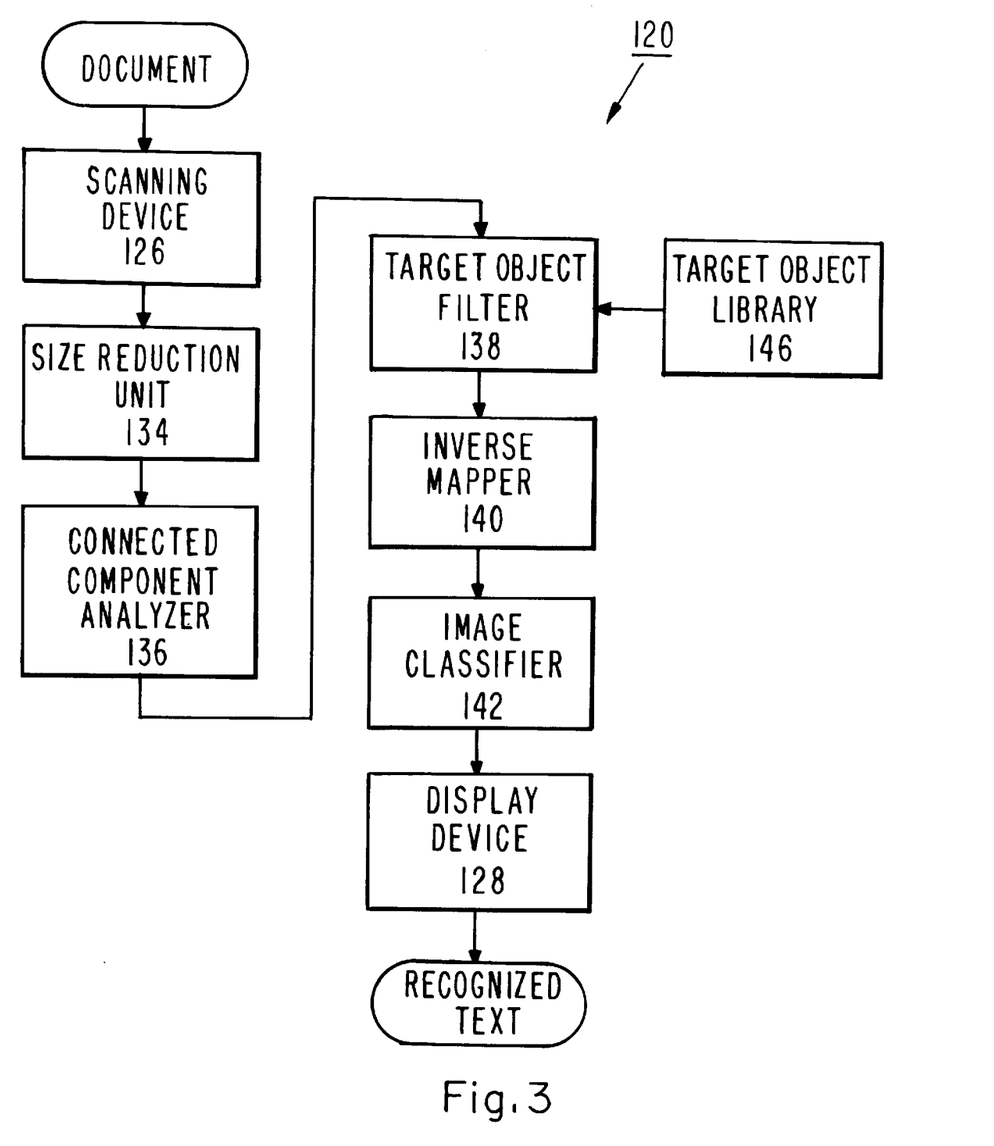
FIG. 3 is a dataflow diagram of an image segmentation system 120 in accordance with the present invention.

Referring now to FIG. 3, there is shown a dataflow diagram of an image segmentation system 120 in accordance with the present invention. For purposes of illustration, the segmentation process is presented in the context of image recognition, including the steps of classifying different parts of the image and displaying the classification symbols (e.g. recognized text). However, one skilled in the art will recognize that the process of segmentation may be performed in the absence of image classification.

Initially, a sample image 144 is obtained by means of scanning device 126, which acquires a pixel-by-pixel representation of an image on a scanned object, such as a piece of paper. If the image is scanned in grayscale or color, it is preferably converted into a bi-level (black and white) image, since most readily-available connected component analyzers 136 and image classifiers 142 accept only bi-level data. One skilled in the art, however, will recognize that grayscale or color data could be used if the foregoing units are adapted to accept multi-bit pixel data.

The conversion is generally performed using a process called thresholding or binarization, which includes selecting a median gray level or color (usually called a "binarization threshold" or "threshold") and changing the value of each image pixel to either zero or one, depending on whether the original gray level or color of the pixel had a value greater or less than that of the threshold. The conversion may be performed by a software module of system 120 or at the device level by scanning device 126. When complete, sample image 144 is preferably a bi-level representation of the image on the scanned object.

Coupled to the scanning device 126 is the size reduction unit 134, which reduces the size of the sample image 144 by applying a reduction factor to create the reduced image 145. As will be explained in greater detail below, the reduction factor is selected in order to ensure that gaps between certain connected components, i.e. characters and words, are filled, resulting in relatively larger objects, i.e. lines, that may be extracted for analysis. In a preferred embodiment, the reduction is performed using a box connectivity approach (BCA) as disclosed in U.S. Pat. No. 5,539,840 to Krtolica et al. for "Multifont Optical Character Recognition Using a Box Connectivity Approach," which is incorporated herein by reference.

Coupled to the size reduction unit is the connected component analyzer 136, which identifies a plurality of connected components in the reduced image 145. In addition, the connected component analyzer 136 assigns a minimum bounding rectangle (MBR), defined by a set of pixel coordinates in the reduced image 145, to each connected component. As noted above, an MBR is the smallest rectangle that completely contains the discrete pattern of a connected component, and is referred to hereafter as, simply, the "rectangle" of the associated object. In a preferred embodiment, the connected component analyzer 136 is a conventional unit that implements a standard "bottom up" algorithm for decomposing the reduced image 145 into basic entities, and aggregating those entities within a particular distance from each other. Such connected component analyzers 136 are well known in the art of image recognition.

Coupled to the connected component analyzer 136 is the target object filter 138, which filters the identified connected components for target objects. In a preferred embodiment, target objects are identified by parameters such as size, shape, granularity, or texture. For example, a basic target object in a document is a line object, which is characterized by size and shape parameters. In one embodiment, these parameters are stored in a target object library 146, which includes target object definitions for one or more target objects, as well as an indication of an associated image classifier 142 for each target object definition.

In a preferred embodiment, the target object filter 138 discards all of the connected components found by the connected component analyzer 136 that do not satisfy the parameters of at least one definition in the target object library 146. For example, if the line object is the only definition in the target object library 146, then all connected components with associated rectangles that are the wrong shape and size for a line object will be discarded.

Coupled to the target object filter 138 is the inverse mapper 140, which locates corresponding rectangles in the sample image 144 for the target object rectangles in the reduced image 145. As described more fully below, the inverse mapper 140 multiplies the pixel coordinates of the target object rectangles in the reduced image 145 by an enlargement factor, which is the reciprocal of the reduction factor for that image. For example, if the reduced image 145 was created with a 0.25 reduction factor, then the target object rectangle coordinates are multiplied by 4 in order to determine the corresponding rectangles in the sample image 144. Thereafter, the portions of the sample image 144 that are mapped by the rectangles are extracted by the inverse mapper 140, and the segmentation is complete.

In one embodiment, the inverse mapper 140 is coupled to a conventional image classifier 142, such as the system disclosed in U.S. Pat. No. 5,539,840 to Krtolica et al. for "Multifont Optical Character Recognition Using a Box Connectivity Approach." The purpose of the image classifier 142 is to recognize the target objects in sample image 144, generally by comparing the target objects with a set of referent images or templates. Thereafter, the classification symbols of the recognized objects (e.g., ASCII code symbols or characters) may be displayed on the display device 128 and manipulated by a word processor or other software application, if desired.

Preferred Methods for Image Segmentation

Figure 4A:
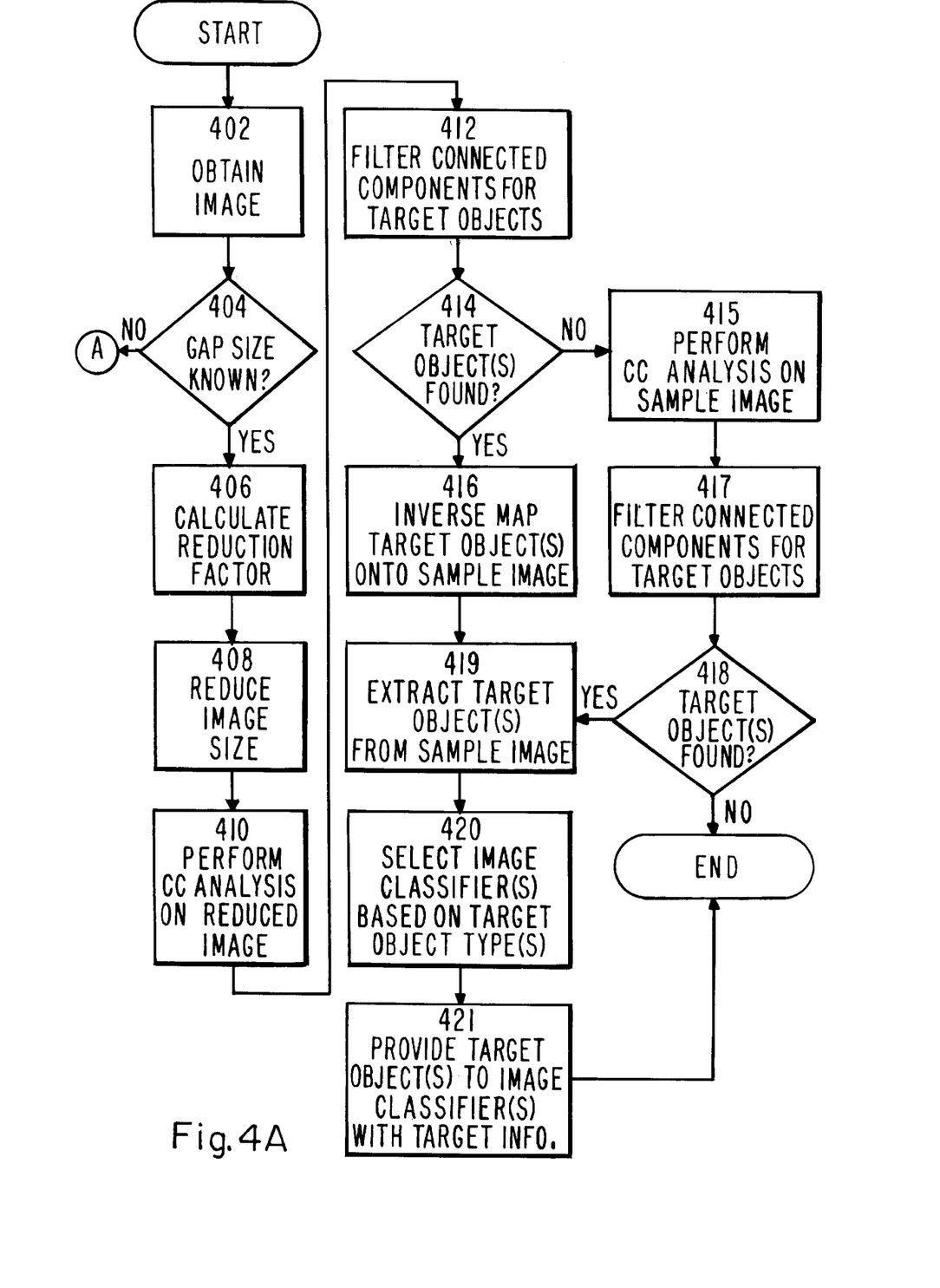
FIGS. 4A–B are a flow diagram of a preferred method for segmenting a sample image 144 in accordance with the present invention.

Referring now to FIG. 4A, there is shown a flow diagram of a preferred method for segmenting an image 144 in accordance with the present invention. The method begins by obtaining 402 the sample image 144 by means of the scanning device 126, as described above. Thereafter, a determination 404 is made whether the gap size is known. A gap is a region of background space between connected components in the foreground of an image. In the context of printed text, for instance, gaps occur between characters, words, lines, paragraphs, columns, and the like. Preferably, the gap size is defined as the maximum width or height in pixels of the relevant gap, since the gap size often varies, even between objects of the same type. For example, in printed text, the inter-character and inter-word gaps often vary because of proportional spacing, even for the same font and font size.

In a preferred embodiment, the gap size is related to the reduction factor. As will be explained in greater detail hereafter, the reduction factor is derived from the gap size in such a way that selected gaps will be filled in the reduced image 145. For example, if lines are the desired target objects for extraction, then the inter-character and inter-word gaps should be filled. After the reduction, a plurality of line objects remain, which are extracted for analysis.

A user of the system 120 may have prior knowledge about the target objects in the sample image 144, such as, for example, the font, the font size, or the line spacing. As shown below, this information can be used to determine the gap size; in a preferred embodiment, this knowledge should be exploited. Thus, if the gap size is known, the method continues with step 406; otherwise, the method continues with step 422.

In step 406, the method continues by calculating the reduction factor. In a preferred embodiment, the reduction factor is defined by the equation:

$$R = \frac{1}{G+1} \qquad \text{Eq. 1}$$

where R is the reduction factor, and G is the gap size in pixels. In FIG. 1, for instance, the gap size between characters in the sample image 144 is three pixels. Thus, applying the foregoing equation, the reduction factor is 0.25. As verified in FIG. 1, a reduction of 1:4 eliminates the inter-character gaps and creates a single connected component.

Table 1 provides examples of common inter-character (letter) gap sizes and the reduction factors needed to fill the gaps. Table 2 provides examples of common inter-word gap sizes and the reduction factors needed to fill the gaps. Table 3 provides examples of common inter-line gap sizes and the reduction factors needed to fill the gaps.

TABLE 1

| | Letter size [pts] | | | | | | | | |
|---|---|---|---|---|---|---|---|---|---|
| | 8 | | | 10 | | | 12 | | |
| | Resolution [dpi] | | | | | | | | |
| | 300 | 400 | 600 | 300 | 400 | 600 | 300 | 400 | 600 |
| Letter size [pixels] | 33 | 44 | 66 | 41 | 55 | 83 | 50 | 60 | 99 |
| Minimum width [pixels] | 7 | 10 | 15 | 9 | 12 | 18 | 11 | 15 | 22 |
| Average width [pixels] | 18 | 25 | 37 | 23 | 31 | 46 | 28 | 37 | 55 |
| Maximum width [pixels] | 33 | 44 | 66 | 41 | 55 | 83 | 50 | 66 | 99 |
| Inter-letter gap [pixels] | 2 | 2 | 4 | 2 | 3 | 5 | 3 | 4 | 6 |
| Inter-letter reduction factor | 1/3 | 1/3 | 1/5 | 1/3 | 1/4 | 1/6 | 1/4 | 1/5 | 1/7 |

TABLE 2

| | Letter size [pts] | | | | | | | | |
|---|---|---|---|---|---|---|---|---|---|
| | 8 | | | 10 | | | 12 | | |
| | Resolution [dpi] | | | | | | | | |
| | 300 | 400 | 600 | 300 | 400 | 600 | 300 | 400 | 600 |
| Inter-word gap [pixels] | 15 | 20 | 29 | 18 | 25 | 37 | 22 | 29 | 44 |
| Inter-word reduction factor | 1/16 | 1/21 | 1/30 | 1/19 | 1/26 | 1/38 | 1/23 | 1/30 | 1/45 |

TABLE 3

| | Inter-line space [typewriter units] | | | | | | | | |
|---|---|---|---|---|---|---|---|---|---|
| | 1 | | | 1.5 | | | 2.0 | | |
| | Inter-line space [pts] | | | | | | | | |
| | 0 | | | 1.5 | | | 3.0 | | |
| | Resolution [dpi] | | | | | | | | |
| | 300 | 400 | 600 | 300 | 400 | 600 | 300 | 400 | 600 |
| Inter-line gap [pixels] | 0 | 0 | 0 | 6 | 8 | 12 | 12 | 17 | 25 |
| Inter-line reduction factor | 1 | 1 | 1 | 1/7 | 1/9 | 1/13 | 1/13 | 1/17 | 1/26 |

After the reduction factor is calculated, the method continues by reducing 408 the size of the image 144 by applying the reduction factor to create the reduced image 145. In a preferred embodiment, this is accomplished using the BCA mapping technique disclosed in U.S. Pat. No. 5,539,840 to Krtolica et al. for "Multifont Optical Character Recognition Using a Box Connectivity Approach."

Figure 5:
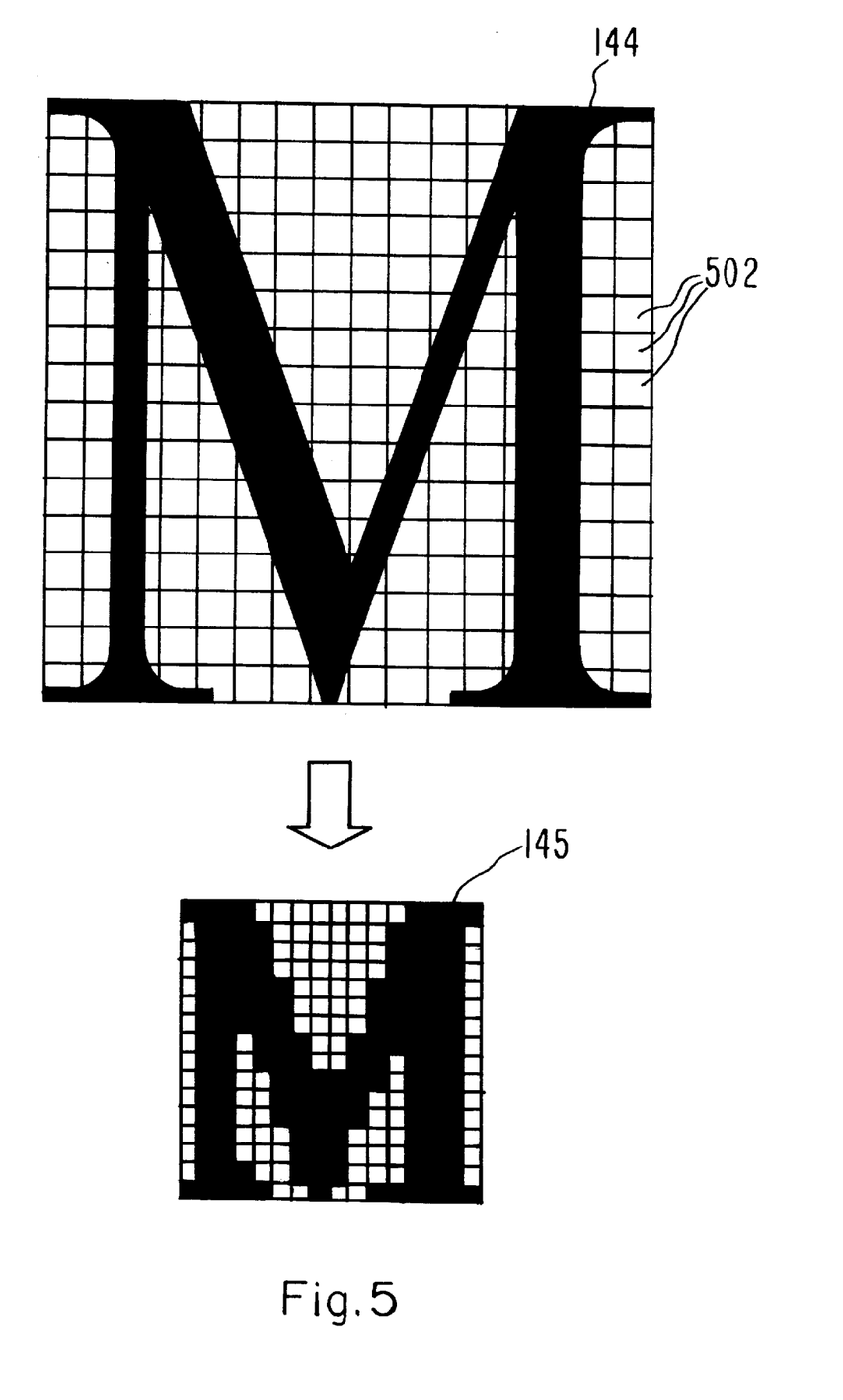
FIG. 5 is an illustration of a preferred mapping procedure in accordance with the present invention.

Referring also to FIG. 5, the sample image 144 is mapped onto a grid of boxes 502, each box 502 corresponding to a pixel of the reduced image 145. In a preferred embodiment, the dimensions of the grid are determined by multiplying the reduction factor by the dimensions of the sample image 144, rounding any fractions to the next highest integer. As shown in FIG. 1, for example, if the reduction factor is 0.25 (1:4), then multiplying 0.25 by the original image dimensions of 12×30 pixels yields a grid with dimensions of 3×8 boxes.

Once the sample image 144 is mapped onto the grid, the size reduction unit 134 analyzes the pixels contained within each box 502 to determine whether the corresponding pixel in the reduced image 145 should be set to 1 (on) or 0 (off). A variety of analysis methods may be used, including pixel density and horizontal or vertical pixel connectivity. For example, in one embodiment, the pixel in the reduce image 145 is set to 1 if a certain percentage, or fill factor, of the pixels associated with the box 502 are likewise set. In a preferred embodiment, however, if a box 502 contains a single pixel that is set to 1, the associated pixel of the reduced image 145 is also set to 1. This is done because a goal of size reduction is to fill gaps and create a number of relatively larger connected components. Thus, by always maximizing the fill factor, the gaps are more likely to be filled. As illustrated in FIG. 5, when the process is complete, the image 145 is a size-reduced, maximally-filled, version of the sample image 144.

After the image size is reduced, the method continues by performing 410 connected component analysis on the reduced image 145. However, unlike conventional techniques, which operate on the sample image 144, the present invention operates on the reduced image 145, resulting in substantially faster analysis. Initially, there are far fewer pixels to analyze in the reduced image 145 than in the sample image 144. For example, as shown in FIG. 1, there are only 24 pixels in the 1:4 reduced image 145 as opposed to 360 pixels in the full-size sample image 144.

Moreover, if conventional segmentation were performed on the sample image 144 of FIG. 1, a number of time-intensive steps would be required, some of which are unnecessary if the present invention were used. First, the three distinct characters, "L", "I", and "J", would be identified in isolation as connected components. Next, a bounding rectangle would be calculated for each distinct character. Thereafter, the relative distances between each rectangle would be calculated. Finally, if the three rectangles were within a certain proximity threshold, the rectangles would be aggregated into a single connected component. One skilled in the art will recognize that this conventional segmentation process requires a large number of calculations. In contrast, the present invention would quickly identify the single connected component in the 1:4 reduced image 145, without the need for the distance calculation and aggregation steps.

After step 410 is performed, a number of connected components are identified in the reduced image 145, some of which may be of interest for extraction purposes. However, one or more of the components may not be desirable for extraction because, for example, the components have no associated image classifier, or simply because they represent noise. Therefore, in a preferred embodiment, the method continues by filtering 412 the identified components for target objects. Target objects are defined as those connected components that are desired for extraction purposes, such as those components for which an image classifier exists.

Typically, target objects are defined by such parameters as size, shape, granularity, texture, intensity of color, and location. One skilled in the art will recognize that the target object size will vary in the reduced image 145 depending on the reduction factor. Thus, if size is the relevant parameter, the filter 138 will search for objects of the correct size for the particular reduced image 145.

In the context of a document, target objects often include text, graphics, charts, photographs, and the like. A line object, for instance, may be defined by parameters such as size and shape. A target object definition is the set of parameters for a given target object. In a preferred embodiment, each of the target object definitions is stored in the target object library 146, which is preferably used by the target object filter 412 to discard connected components that are not desirable for extraction. For example, if the line object is the only definition in the target object library 146, then all connected components with rectangles that are the wrong shape or size for a line object will be discarded.

After the connected components have been filtered 412 for target objects, a determination 414 is made whether any target objects were found. If none were found, then the method continues by performing 415 connected component analysis on the original sample image 144, as is done conventionally. Because the mapping process inevitably results in a loss of image information, it is possible that some reduced images 145 cannot be segmented into target objects, although the sample image 144 can still be segmented using conventional techniques. When this situation occurs, there is little choice but to resort to standard connected component analysis of the sample image 144. Thereafter, the connected components in the sample image 144 are filtered 417 for target objects as in step 412. A determination 418 is then made whether any target objects were found. If none were found, the method ends; otherwise, the method continues at step 419.

If at least one target object was found in step 414, the method continues with step 416 by inverse mapping the target object rectangles, which involves locating the rectangles in the sample image 144 that corresponds to the target object rectangle in the reduced image 145. As noted earlier, the rectangles of the target objects are defined by pixel coordinates in the reduced image 145. However, the goal of segmentation is to extract target objects from the sample image 144. Thus, in a preferred embodiment, the rectangles of the reduced image 145 are inverse mapped onto the sample image 144 by multiplying their associated pixel coordinates by an enlargement factor, which is the reciprocal of the reduction factor for the reduced image 145.

Figure 6:
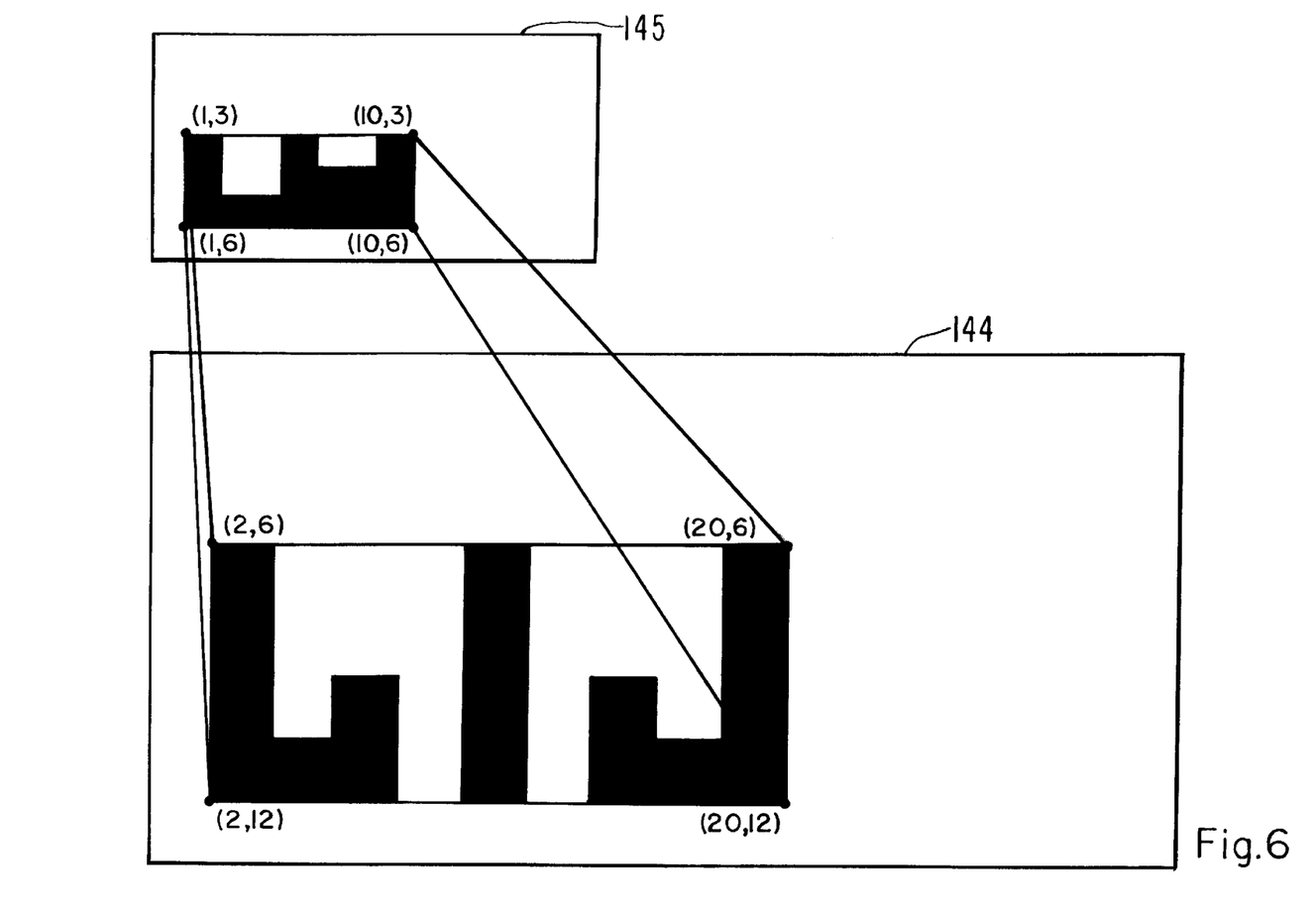
FIG. 6 is an illustration of a preferred inverse mapping procedure in accordance with the present invention.

FIG. 6 is an illustration of a preferred inverse mapping process. In this example, the reduced image 145 was made with a reduction factor of 0.5, which was chosen in order to fill the gaps between the letters "L", "I", and "J", and produce a single connected component in the reduced image 145. Consequently, after steps 410 and 412, a single target object was identified in the reduced image 145 with a rectangle defined at pixel coordinates {(1,3), (10,3), (1,6), (10,6)}. In order to determine the corresponding rectangle in sample image 144, the pixel coordinates are preferably multiplied by the enlargement factor, which, in present example, is 2 (i.e. 1/0.5). The resulting rectangle in the sample image 144 is thus defined at pixel coordinates {(2,6), (20,6), (2,12), (20,12)}.

After the target object rectangles are inverse mapped in step 416, the sample image 144 is technically "segmented." However, in accordance with the present invention, a number of steps may be performed thereafter to prepare the segmented data for analysis by the image classifier 142. In a preferred embodiment, the method continues by extracting 419 the target objects from the sample image 144. One skilled in the art will recognize that the extraction may be done in a number of ways. For example, the pixels of the sample image 144 contained within the target object rectangles may be copied to another portion of memory 132 to form a plurality of sub-images. Alternatively, some image classifiers 142 only require pointers to one or more structures in memory defining the target object rectangles. Thus, the extraction step may only involve creating the required structures and passing pointers thereto to the image classifier 142.

After the target objects are extracted, an image classifier 142 is selected 420 for each target object. As noted earlier, the target object library 146 includes an indication of an image classifier 142 for each target object definition. Thus, for each extracted object, an association is made with an appropriate image classifier 142. In the case of text objects, for instance, any of a number of conventional binary image classifiers 142 may be selected, such as the system described in U.S. Pat. No. 5,539,840 to Krtolica et al. for "Multifont Optical Character Recognition Using a Box Connectivity Approach."

After the image classifier 142 is selected, the method continues by providing 421 the image classifier 142 with the extracted target objects, as well as additional information about the target objects. To improve recognition accuracy, some image classifiers 142 accept user input as to characteristics of the images to be recognized, such as the expected font, font size, line spacing, and the like. The present invention is often able to determine this information automatically, and thus may be adapted to provide such data to the image classifier 142. For example, the size and shape of the target object rectangle may indicate the point size of a font. In addition, the gap size is related to the font size as shown in Tables 1–2. Thus, in a preferred embodiment, this target object information is provided to the classifier 142 to assist in image recognition, and the method is complete.

Figure 4B:
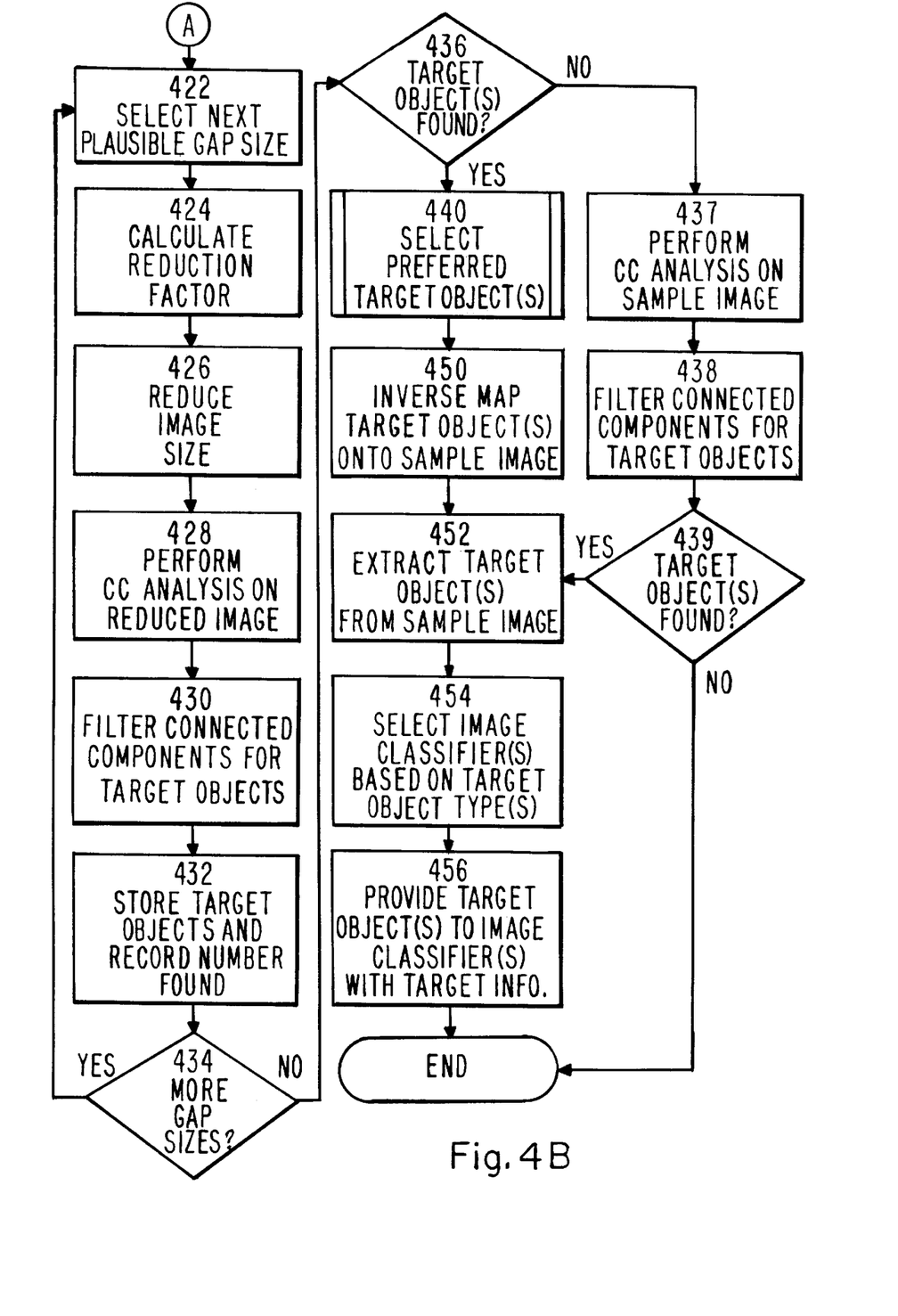

If, in step 404, it was determined that the gap size is not known, reference is made to FIG. 4B in which the method continues by selecting 422 the next plausible gap size. Often, a user of the system 120 will have no prior knowledge about document characteristics such as font size. Moreover, it is often desirable to perform image segmentation in the absence of human interaction, such as in an automated archival system. In these cases, the system 120 must determine the correct gap size for creating the desired target objects in the reduced image 145.

To accomplish this, several plausible gap sizes are selected, after which multiple reductions of the image 144 are made by applying the corresponding reduction factors. In a standard document, for instance, plausible gap sizes could be selected for font sizes of 8, 10, and 12 points. As shown in Table 3, at 600 dpi resolution, the foregoing font sizes will result in gap sizes of 4, 5, and 6, respectively. One skilled in the art will recognize that many possible gap sizes exist for a variety of objects other than text. Moreover, the set of plausible gap sizes may vary between uses of system 120, depending on the expected composition of the image 144 to be segmented.

After the next gap size is selected, the method continues by calculating 424 the reduction factor, as described in step 406, and reducing 426 the image size, as described in step 408. Thereafter, the method continues by performing 428 connected component analysis on the reduced image 145 in the manner of step 410. The resulting connected components are then filtered 430 for target objects as in step 412.

After step 430, the resulting target objects, if any, are provisionally stored until a determination is made as to which gap size is optimal for generating the desired target objects. Preferably, this is done by storing the coordinates of the target object rectangles in a portion of the memory 132. Also stored are the gap size that produced the target objects, and the number target objects found for the particular gap size. As will be described below, the record of the number of target objects is used to determine which of the plausible gap sizes is optimal for producing target objects.

The method continues after step 432 by determining 434 whether more plausible gap sizes remain to be tested. If so, the method returns to step 422; otherwise, the method continues by determining 436 whether any target objects were found in any of the reduced images 145. If none were found, the method continues by performing 437 connected component analysis on the original sample image 144, as is done conventionally. Because the mapping process inevitably results in the loss of information, it is possible that some reduced images 145 cannot be segmented into target objects, although the sample image 144 can still be segmented using conventional techniques. When this situation occurs, there is little choice but to resort to connected component analysis of the sample image 144. Thereafter, the connected components in the sample image 144 are filtered 438 for target objects as in step 430. A determination 439 is then made whether any target objects were found. If none were found, the method ends; otherwise, the method continues at step 452.

If, however, at least one target object was found, the method continues by selecting 440 a set of preferred target objects. One skilled in the art will recognize that each selected gap size will result in a different reduced image 145, which may produce a different set of target objects and, therefore, a different segmentation. However, one segmentation is probably more accurate than the others. Therefore, in a preferred embodiment, the best segmentation is selected.

Figure 4C:
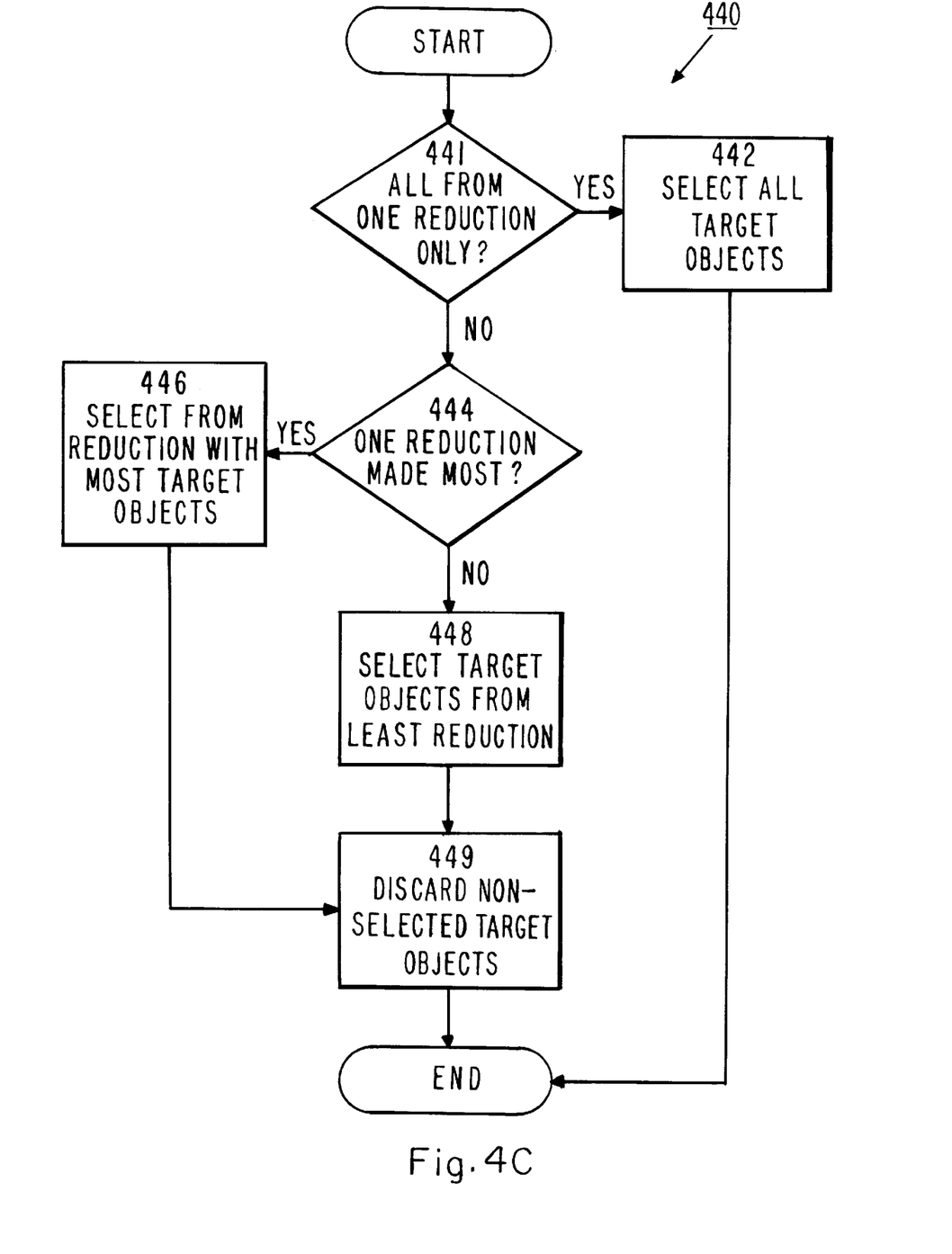
FIG. 4C is a flow diagram for a preferred method for selecting a preferred set of target objects.

Referring now to FIG. 4C, there is shown a method for selecting a preferred set of target objects, and thus, the best segmentation. The method begins by determining 441 whether all of the target objects were found in only one reduced image 145. Preferably, this is done by inspecting the record of number of target objects found for each gap size and associated reduction. If only one reduction produced all of the target objects, all of the target objects are selecting 442 as the preferred target objects, after which the method is complete.

If, however, there were target objects found in more than one reduced image 145, the method continues by determining 444 whether one reduced image 145 produced the most target objects. If so, the target objects found in that reduced image 145 are selected 446 as the preferred target objects. If, however, two or more reduced images 145 tied for the most target objects, the target objects found in the least-reduced image are selected. For example, if two reduced images 145 with reduction factors of 0.25 and 0.5, respectively, tied for the most target objects, then the target objects found in the image with a 0.5 reduction factor are selected, since less information was lost in the mapping process.

After either steps 446 or 448, the non-selected target objects are preferably discarded 449. However, in an alternative embodiment, all of the target objects are retained that were found in the various reduced images 145. The target objects are then grouped according to the reduced image 145 in which they were found, and the groups are sorted according to the number of objects in the group. Thereafter, the group with the largest number of objects is preferably sent to the image classifier 142 first. If, however, the image classifier 142 has difficulty in recognizing the target objects in that group, such as where many recognition errors are found, then it is likely that a different segmentation was the correct one. Therefore, the next largest group of target objects is provided to the image classifier 145, and so on, until the best segmentation is found.

After the preferred target objects are selected, the method continues substantially as described in steps 416, 418, 419, and 420 of FIG. 4A, wherein the target objects are inverse mapped 450 onto the sample image 144, the target objects are extracted 452 from the sample image 144, one or more image classifiers 142 are selected 454 based on the target object types, and the extracted target objects are provided 456 to the one or more image classifiers 144, after which the method is complete.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. In an image segmentation system, a method for segmenting a sample image into at least one target object, the method comprising the steps of:
    reducing the size of the sample image to create a reduced image containing target objects;
    identifying at least one target object in the reduced image; and
    locating at least one bounding rectangle in the sample image corresponding to a bounding rectangle of the at least one target object in the reduced image.

2. The method of claim 1, further comprising the step of:
    extracting at least one portion of the sample image defined by the at least one bounding rectangle in the sample image.

3. The method of claim 1, wherein the reducing step comprises:
    calculating a reduction factor; and
    mapping the sample image onto the reduced image.

4. In an image segmentation system, a method for segmenting a sample image into at least one target object, the method comprising the steps of:
    reducing the size of the sample image to create a reduced image;
    identifying at least one target object in the reduced image; and
    locating at least one bounding rectangle in the sample image corresponding to a bounding rectangle of the at least one target object in the reduced image;
    wherein the reducing step comprises:
        calculating a reduction factor; and
        mapping the sample image onto the reduced image;
    and the calculating step comprises:
        determining a gap size; and
        calculating a reduction factor,
    wherein the reduction factor is defined by the equation:

$$R = \frac{1}{G+1}$$

wherein R is the reduction factor, and G is the gap size in pixels.

5. The method of claim 1, wherein the reducing step comprises:
    calculating a reduction factor; and
    mapping the sample image onto the reduced image, and the mapping step comprises:
        mapping the sample image onto a grid of boxes, each box corresponding to a pixel of the reduced image; and
        setting a color of a pixel in the reduced image according to the percentage of pixels of that color in the corresponding box of the sample image.

6. The method of claim 4, wherein the gap size is determined from user input.

7. The method of claim 4, wherein the gap size is determined by selecting one of a plurality of plausible gap sizes for an image.

8. The method of claim 5, wherein the dimensions of the grid are determined by multiplying the reduction factor by the dimensions of the sample image and rounding any fractions to the next highest integer value.

9. The method of claim 1, wherein each target object is characterized by a target object definition, each target object definition comprising at least one parameter.

10. The method of claim 9, wherein the at least one parameter is taken from the group of parameters comprising size, shape, granularity, texture, intensity of color, and location.

11. The method of claim 9, wherein the step of identifying the at least one target object in the reduced image comprises the substeps of:
    identifying at least one connected component in the reduced image;
    assigning a bounding rectangle to the at least one connected component; and
    determining whether the at least one connected component is a target object.

12. The method of claim 11, wherein the step of determining whether the at least one connected component is a target object comprises the substeps of:
    comparing the at least one connected component with at least one target object definition from a target library, the at least one target object definition comprising at least one parameter characterizing a target object; and
    responsive to the at least one connected component satisfying the at least one target object definition, selecting the at least one connected component as a target object.

13. The method of claim 1, wherein the locating step comprises:

multiplying a set of coordinates associated with a bounding rectangle of the target object by an enlargement factor, wherein the enlargement factor is the reciprocal of a reduction factor for the reduced image.

14. In an image segmentation system, a method for segmenting a sample image into at least one target object, the method comprising:

selecting a plurality of gap sizes; and for each selected gap size:

reducing the size of the sample image, wherein the sample image is reduced by applying a reduction factor defined by the equation:

$$R = \frac{1}{G+1}$$

wherein R is the reduction factor, and G is the gap size in pixels;

identifying each target object in the reduced image; and recording the number of identified target objects for the selected gap size.

15. The method of claim 14, wherein the step of identifying each target object in the reduced image comprises:

performing connected component analysis on the reduced image to identify a number of connected components; and filtering the identified connected components for target objects.

16. The method of claim 15, wherein the filtering step comprises the substeps of:

comparing the identified connected components with a number of target object definitions in a target object library, each target object definition comprising at least one parameter characterizing a target object; and responsive to a connected component satisfying at least one target object definition in the target object library, selecting the connected component as a target object.

17. The method of claim 14, further comprising the steps of:

selecting at least one preferred target object from the target objects;

locating at least one bounding rectangle in the sample image corresponding to a bounding rectangle of the at least one preferred target object in the reduced image.

18. The method of claim 17, wherein the step of selecting at least one preferred target object comprises the substeps of:

responsive to one reduced image comprising more target objects than any other reduced image, selecting as preferred target objects the target objects found in the one reduced image;

responsive to at least two reduced images comprising more target objects than any other reduced image, selecting as preferred target objects the target objects found in the one of the at least two reduced images that is least reduced with respect to the sample image.

19. The method of claim 18, further comprising the steps of:

discarding the target objects that are not selected as preferred target objects.

20. A system for segmenting a sample image into at least one target object, the system comprising:

a size reduction unit for converting the sample image into a reduced image; and coupled to the size reduction unit, a connected component analyzer for identifying at least one connected component in the reduced image and assigning to the at least one connected component a bounding rectangle.

21. The system of claim 20, further comprising:

coupled to the connected component analyzer, a target object filter for determining whether the at least one connected component is at least one target object.

22. The system of claim 21, further comprising:

coupled to the target object filter, a target object library for storing at least one target object definition, each target object definition characterizing a target object.

23. The system of claim 22, wherein the at least one target object definition comprises at least one parameter taken from the group of parameters comprising size, shape, granularity, texture, intensity of color, and location.

24. The system of claim 21, further comprising:

coupled to the target object filter, an inverse mapper for locating at least one bounding rectangle in the sample image corresponding to a bounding rectangle of the at least one target object in the reduced image.

25. A computer-readable medium having computer-readable program code devices embodied therein for segmenting a sample image into at least one target object, the computer-readable medium comprising:

computer-readable program code devices configured to reduce the size of the sample image to create a reduced image;

computer-readable program code devices configured to identify at least one target object in the reduced image; and computer-readable program code devices configured to locate at least one bounding rectangle in the sample image corresponding to a bounding rectangle of the at least one target object in the reduced image.

26. The method of claim 1 wherein the reducing step comprises calculating a reduction factor according to a gap size; and mapping the sample image onto the reduced image.

27. The method of claim 1 wherein the reduced image contains only extracted target objects.

28. In an image segmentation system, a method for segmenting a sample image into at least one target object, the method comprising the steps of:

reducing the size of the sample image to create a reduced image;

identifying at least one target object in the reduced image; and locating at least one bounding rectangle in the sample image corresponding to a bounding rectangle of the at least one target object in the reduced image.

* * * * *